Aug. 13, 1957     H. S. ROSS     2,802,675
SHOCK ABSORBER FOR VEHICLES
Filed May 2, 1955     2 Sheets-Sheet 1
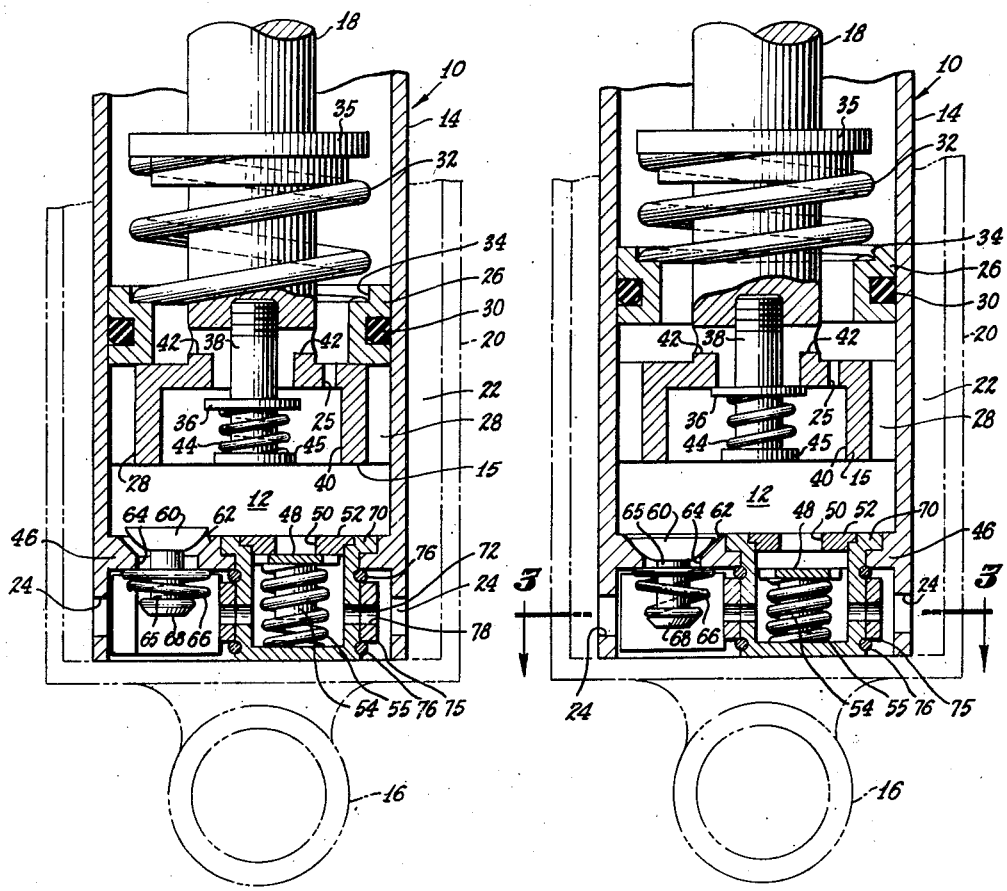
HOWARD S. ROSS,
INVENTOR.
BY
ATTORNEY.

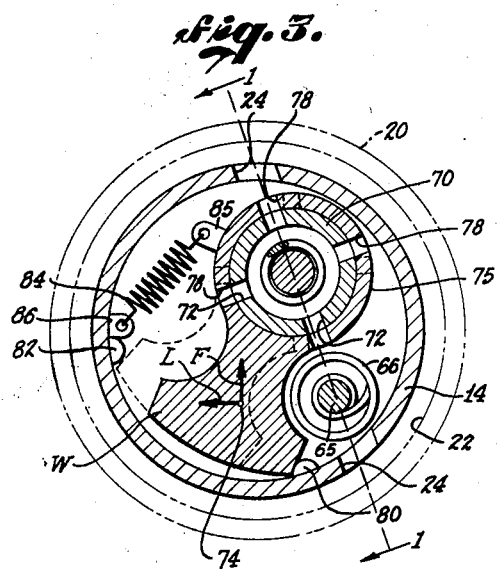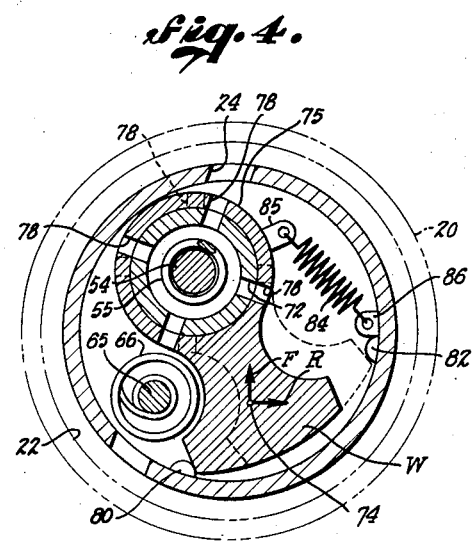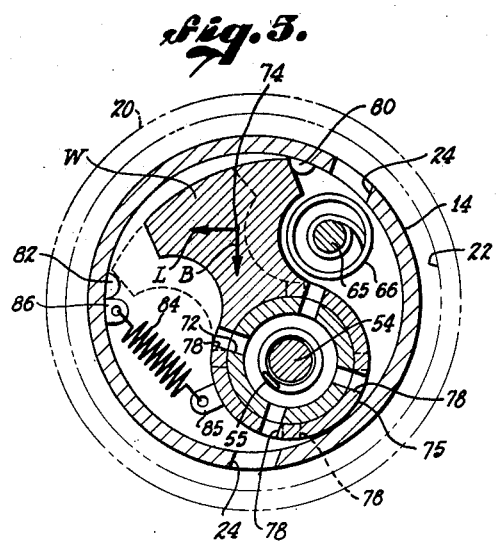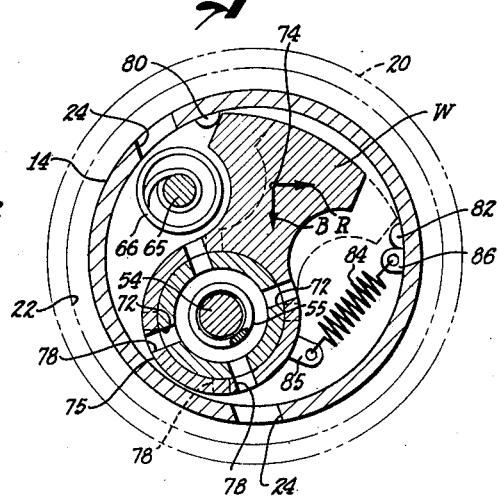
HOWARD S. ROSS,
INVENTOR.
ATTORNEY.

United States Patent Office 2,802,675
Patented Aug. 13, 1957

2,802,675

SHOCK ABSORBER FOR VEHICLES

Howard S. Ross, Twin Falls, Idaho

Application May 2, 1955, Serial No. 505,203

8 Claims. (Cl. 280—124)

This invention relates to shock absorbers for use on vehicles and is directed to a shock absorber construction that will automatically resist excessive swaying of a vehicle body.

A shock absorber between a vehicle body and a wheel axle must normally yield readily to absorb the usual road shocks and "soft" riding can be achieved only by highly responsive shock absorber action. On the other hand, the greater the yieldability of the four shock absorbers, the more vulnerable the vehicle to sway longitudinally and laterally in response to inertia forces. Thus the more sensitive the shock absorbers to inertia forces, the more the vehicle body sways back or "squats" when suddenly and severely accelerated, the more the vehicle body dips forward or "nose dives" when suddenly and severely decelerated, and the more the vehicle body sways outward by centrifugal action on a curve. Because of these conflicting considerations the degree of responsiveness of the shock absorbers of a vehicle is usually a compromise, the yieldability being less than optimum for soft riding but not sufficient to eliminate undesirable inertia responses to sudden starts, stops and changes in direction.

The present invention meets this general problem by a shock absorber construction that automatically reduces its yieldability in response to the same inertia forces that tend to sway the vehicle longitudinally and laterally. With such automatic action the shock absorbers are highly yieldable to shock forces during normal straight ahead driving to result in soft riding and yet stiffen to reduce body sway arising from inertia forces.

In the preferred practice of the invention the stiffening action in response to inertia forces is achieved by providing each of the four shock absorbers with a weight that is free to swing through a substantially horizontal arc, the weight being oriented to respond to selected inertia components. Each weight is adapted to reduce the yield of the shock absorber in accordance with a longitudinal inertia component which may be either forward or rearward and further in accordance with a lateral inertia component which may be either rightward or leftward. Thus each shock absorber is responsive to inertia forces that lie in a horizontal quadrant with respect to the pivot axis of the responsive weight and each of the four shock absorbers is mounted on the vehicle with its particular quadrant oriented for its desired automatic action.

The right forward shock absorber stiffens in response to inertia forces in the right forward quadrant; the left forward shock absorber stiffens in response to inertia forces in the left forward quadrant; the right rearward shock absorber stiffens in response to inertia forces in the right rearward quadrant; and the left rearward stiffens in response to inertia forces in the left rearward quadrant. With each of the four shock absorbers stiffening in this manner in response to inertia forces in its particular quadrant the vehicle does not sway backward when started abruptly nor sway forward when stopped abruptly, nor sway outward on a curve.

Pivoted weights may be operatively connected to various types of shock absorbers in various practices of the invention. In the presently preferred practice of the invention disclosed herein the pivoted weight is operatively connected to a shock absorber of the hydraulic type and operates a valve to restrict the freedom of flow of the hydraulic fluid in response to inertia forces.

The various features and advantages of the invention will be apparent from the following description considered with the accompanying drawings.

In the drawings, which are to be regarded as merely illustrative:

Figure 1 is a fragmentary vertical sectional view of the selected embodiment of the invention, taken as indicated by the line 1—1 of Figure 3 and showing the action of various valves as the shock absorber expands upward;

Figure 2 is a similar view showing the shock absorber in the course of downward contraction;

Figure 3 is a transverse section taken as indicated by the line 3—3 of Figure 2 showing the orientation of the inertia-responsive weight in the left front shock absorber of a vehicle;

Figures 4, 5, and 6 are similar views of the right front, left rear, and right rear shock absorbers, respectively.

As shown in Figures 1 and 2, the selected embodiment of the invention comprises a hydraulic shock absorber, generally designated by numeral 10, which is of a well known type adapted for mounting between the body and a wheel axle of a vehicle. The shock absorber 10 has the usual hydraulic chamber 12 which expands in response to elongation or upward extension of the shock absorber and contracts in response to contraction of the shock absorber. As will be explained, an inertia-responsive weight controls the rate of release of hydraulic fluid from the chamber 12.

In the construction shown, the hydraulic chamber 12 is the interior of an upright cylinder 14 that is closed by a piston 15. The cylinder 14 is formed with a fitting 16 at its lower end and the piston rod 18 that extends upward from the piston 15 terminates in a similar fitting, these two fittings being utilized for mounting the shock absorber in a well known manner. United with the lower end of the cylinder 14 is a larger concentric cylinder 20 which provides an annular reservoir 22 for the hydraulic fluid, the lower end of the cylinder 14 having suitable peripheral ports 24 for communication with this reservoir.

In the presently preferred practice of the invention it is contemplated that the piston 15 will be provided with a suitable restricted orifice for a minimum rate of fluid flow therethrough, and will be additionally provided with a release valve and a rebound valve, the release valve opening for increased upflow through the piston and the rebound valve opening for increased downflow. In the construction shown, the piston 15 which is integral with the piston rod 18 has an orifice 25 which is constantly open for fluid flow through the piston at a predetermined rate. The release valve for increased upflow when desired, comprises a ring-shaped release valve member 26 which normally closes the upper end of peripheral passages 28 through the piston. This ring-shaped release valve member, which may be provided with a suitable O-ring 30, is urged downward by a suitable helical spring 32. The lower end of the spring 32 seats in an annular recess 34 in the ring-shaped release valve member 26 and is confined at its upper end by a suitable keeper 35 that is fixedly mounted on the piston rod 18.

The rebound valve in the piston 15 comprises a rebound valve member in the form of a flat ring 36 which is slidingly mounted on a stud 38 in a circular recess 40 on the underside of the piston. The ring-shaped rebound valve member 36 normally closes fluid passages 42 through the piston, the valve member being urged toward its closed position by a suitable spring 44 that seats against a flange 45 on the lower end of the stud 38.

The interior of the cylinder 14 is spanned by a web 46 that forms the bottom of the chamber 12 and both a suitable blow-off valve and a suitable refill valve are mounted in this web to control fluid flow between the chamber 12 and the reservoir 22 through the peripheral ports 24. The blow-off valve may comprise a blow-off valve member 48 that normally closes a valve port 50 in a circular insert 52 that is fixedly mounted in the web 46. The blow-off valve member 48 comprises a disc having a stem 54 surrounded by a suitable spring 55 that urges the valve to closed position.

The refill valve comprises a refill valve member 60 that normally rests in a tapered valve seat 62 to close a passage 64 through the web 46. The refill valve member 60 has a stem 65 surrounded by a suitable spring 66. The upper end of the spring 66 seats against the web 46 and the lower end of the spring seats against an enlargement 68 on the stem 65 to urge the valve member 60 into closed position.

The spring 66 of the refill valve is relatively light to permit the refill valve member 60 to open at relatively low pressure. The spring 55 of the blow-off valve is relatively heavy to cause the blow-off valve member 48 to open in response to a fluid pressure that is between two and three times the pressure required to unseat the release valve member 26. By virtue of this arrangement the hydraulic fluid will flow upward through the release valve of the piston at a lower pressure than it will flow through the blow-off valve into the reservoir 22 so that the space in the cylinder 14 above the piston 15 will be full of hydraulic fluid at all times and only the fluid displaced by the piston rod 18 will flow through the blow-off valve when the shock absorber contracts. Thus the blow-off valve member 48 controlled by the spring 55 limits the rate of downward movement of the piston 15 in response to forces tending to contract the shock absorber.

The structure described to this point is conventional. The invention is directed to additional valve means to restrict the rate of flow through the blow-off valve in response to inertia forces. It will be apparent to those skilled in the art that various means may be provided for this purpose.

In the construction shown, the circular insert 52 is seated in a cup-shaped insert 70 that, in turn, is seated in the web 46. The cup-shaped insert 70 encloses the blow-off valve member 48 and is provided with four peripheral ports 72 through which the hydraulic fluid must flow between the blow-off valve and the reservoir 22.

As best shown, in Figure 3, a suitable weight W with its center of gravity at the point 74 is integral with a ring 75 that rotatably embraces the cup-shaped insert 70. The ring 75 is rotatably retained by a pair of split rings 76 that seat in corresponding circumferential recesses in the cup-shaped insert 70. The ring 75 has four peripheral ports 78 which correspond to the peripheral ports 72 and register therewith at one rotary position of the weight W. The weight W is in a horizontal plane with the wheels of the vehicle and is movable in an arc between a pair of spaced stops 80 and 82 which may comprise rivets mounted in the wall of the cylinder 14. A suitable spring 84 normally holds the weight W against the stop 80, one end of the spring being anchored to an ear 85 on the ring 75 and the other end being anchored to an ear 86 on the inner wall of the cylinder 14.

In Figure 3, which represents the left front shock absorber of a set of four shock absorbers, the weight W is movable in the left rear quadrant represented by the stops 80 and 82 and the spring 84 normally holds the weight at its rearward limit position with the ports 78 in registry with the ports 72 for free flow of hydraulic fluid from the blow-off valve to the reservoir 22. It is apparent that the weight W in Figure 3 will move from its normal position either in response to a forward component of force represented by the arrow F or a leftward component of force represented by the arrow L.

In like manner, the right front shock absorber represented by Figure 4 is oriented for movement of its weight W in a right rearward quadrant represented by the two stops 80 and 82. It is apparent that in this right front shock absorber the weight W will respond to the same forward component of force F and will also respond to a rightward component of force R.

The two rearward shock absorbers represented by Figures 5 and 6 are oriented for their weights W to move in forward quadrants. Thus in Figure 5 representing the left rear shock absorber, the weight W will respond to a rearward component of force B and will also respond to a leftward component of force L. In like manner the weight W in Figure 6 representing the right rear shock absorber will respond to a rearward component of force B and a rightward component of force R.

The manner in which the four shock absorbers cooperate for their purpose will be readily understood from the foregoing description. If the vehicle is suddenly and severely accelerated, as from a standing start, the two rear shock absorbers shown in Figures 5 and 6 tend to contract to a certain degree with consequent flow of fluid through their blow-off valves into their reservoirs 22. Such sudden contraction of the two rearward shock absorbers is prevented, however, because the two rearward weights W respond to the rearward components of force B by rotation away from the stop pins 80 towards the stop pins 82 to move the ports 78 out of registry with the ports 72 for restricting the escape of fluid to the reservoir. Only the rearward shock absorbers respond in this manner.

Whenever the brakes are applied suddenly or severely, the two forward shock absorbers represented by Figures 3 and 4 tend to collapse, thereby causing the vehicle body to "nose dive." The vehicle body is prevented from making such a forward dip, however, by the action of the two forward weights W both of which respond to the forward component of force F to restrict fluid flow through blow-off valve to the reservoir of each of the forward shock absorbers. The two rearward shock absorbers represented by Figures 5 and 6 are not affected by deceleration on a straight run.

Whenever the vehicle rounds a curve at relatively high speed the weights W in the two outer shock absorbers respond to centrifugal force by restricting flow through the corresponding blow-off valves. Thus in making a severe left-hand turn, the centrifugal force will be rightward and the weights W of the two shock absorbers on the right hand side of the car represented by Figures 4 and 6 will respond to the rightward components of force R to check the tendency of the vehicle body to dip to the right. In like manner, the two left hand shock absorbers represented by Figures 3 and 5 will respond to the leftward components of force L to check the outward sway of the vehicle body when the vehicle makes a sharp right turn at a relatively high speed.

It is apparent that the quadrants of responsiveness of the four shock absorbers may be varied or, in effect, rotated either by varying the positions of the stops 80 and 82 or by bodily rotating the shock absorbers. Thus responsiveness of the weight to longitudinal acceleration and deceleration forces at the cost of responsiveness to lateral centrifugal forces may be increased by slight rotation clockwise of the ranges of movement of the left front weight and the right rear weight and slight counterclockwise shifting of the ranges of movement of the right front weight and the left rear weight. In like manner, slight rotation of the ranges of movement in the opposite rotary directions will increase the responsiveness of the shock absorbers to centrifugal force at the cost of responsiveness to acceleration and deceleration. The same results can be achieved by appropriately shortening the ranges of rotation of the weights by shifting one of the two stops 80 and 82.

The pre-loading or normal stressing of the springs 84 may be varied as desired to determine the magnitude of inertia force at which control will begin by the responsive action of the pivoted weight of a shock absorber. Relatively high pre-loading of the springs 84 causes automatic control to occur only at high speeds around corners and only when the vehicle is subject to exceptionally high acceleration or deceleration in straight line driving. On the other hand, low pre-loading of the spring 84 results in the exercise of control at relatively low speeds around corners and at relatively low accelerations and decelerations of the vehicle.

It is further apparent that the degree to which the ports 78 in the ring 75 of the weight are permitted to move out of alignment with the ports 72 will determine the degree of resistance to contraction of a shock absorber in response to inertia forces. Thus if the ports 78 are permitted to move completely out of alignment with the ports 72, the hydraulic fluid will flow through the blow-off valve at an exceedingly low rate for maximum resistance to contraction of the shock absorber. On the other hand if the ports 78 are kept from moving completely out of alignment with the ports 72, the resistance to collapsing of the shock absorbers will be greatly decreased.

In this particular embodiment of the invention, the weight-controlled valve that responds to inertia forces is built into the shock absorber at the factory. A feature of the invention, however, is that such a weight-responsive valve may be added to existing shock absorbers at very small costs. In this respect a feature of the invention is that the additional structure occupies relatively little additional space.

Although the now preferred embodiment of the present invention has been shown and described herein, it is to be understood that the invention is not to be limited thereto, for it is susceptible to changes in form and detail within the scope of the appended claims.

I claim:

1. Means to reduce the inertia responsiveness of a yieldingly mounted vehicle body, comprising: four shock absorbers located respectively at the left-front, right-front, left-rear, and right-rear regions of the body to resist relative vertical movement of the body at the four regions, each of said shock absorbers having a closed self-contained hydraulic system including at least one chamber that expands and contracts to permit relative vertical movement of the body; a valve means completely housed inside each of said shock absorbers to restrict liquid flow out of said chamber thereby to create resistance to contraction of the chamber, each of said valve means being movable by inertia along an operating path in a quadrant oriented for response both to inertia forces laterally of the vehicle and to inertia forces longitudinally of the vehicle, with two valve means at one end of the vehicle opposing forward inertia sway of the vehicle, two valve means at the other end opposing rearward inertia sway, two valve means on one side opposing inertia sway in one lateral direction and two valve means on the other side opposing inertia sway in the other lateral direction.

2. A combination as set forth in claim 1 in which said operating paths are more nearly horizontal than vertical.

3. A combination as set forth in claim 2 in which said operating paths are inclined from the vertical to cause the valve means to seek open positions by gravity.

4. A combination as set forth in claim 1 in which said operating paths are more nearly horizontal than vertical; and which include yielding means to maintain said valve means open in the absence of inertia forces.

5. A combination as set forth in claim 1 in which each of said shock absorbers is of cylindrical configuration and each of said valve means and its operating path lie entirely within the confines of the cylindrical configuration.

6. Means to reduce the inertia responsiveness of a yieldingly mounted vehicle body, comprising: four shock absorbers located respectively at the left-front, right-front, left-rear and right-rear regions of the body to resist relative vertical movement of the body at the four regions, each of said shock absorbers having a closed self-contained hydraulic system including at least one chamber that expands and contracts to permit relative vertical movement of the body; a valve means completely housed inside each of said shock absorbers to restrict liquid flow out of said chamber thereby to create resistance to contraction of the chamber, each of said valve means being movable by inertia along an operating path in a quadrant oriented for response both to inertia forces laterally of the vehicle and to inertia forces longitudinally of the vehicle, with two valve means at one end of the vehicle opposing forward inertia sway of the vehicle, two valve means at the other end opposing rearward inertia sway, two valve means on one side opposing inertia sway in one lateral direction, two valve means on the other side opposing inertia sway in the other lateral direction; and a release valve in each of said shock absorbers to release liquid from said chamber in response to pressure therein.

7. A combination as set forth in claim 6 in which said release valve is in series with said inertia responsive valve means.

8. A combination as set forth in claim 7 in which said chamber is formed by a piston and a cylinder; and which includes an additional release valve in said piston.

References Cited in the file of this patent

UNITED STATES PATENTS

| 1,980,934 | Simpson | Nov. 13, 1934 |
| 2,072,181 | Paton | Mar. 2, 1937 |

FOREIGN PATENTS

| 1,040,639 | France | Oct. 16, 1953 |